(12) United States Patent
Ongeche

(10) Patent No.: US 11,124,433 B2
(45) Date of Patent: Sep. 21, 2021

(54) METHOD OF MANAGING IONIZATION FOR BIOFOULING CONTROL IN FRESH RAW WATER INTAKES

(71) Applicant: Fredrick Billy Otieno Ongeche, Wichita, KS (US)

(72) Inventor: Fredrick Billy Otieno Ongeche, Wichita, KS (US)

(*) Notice: Subject to any disclaimer, the term of this patent is extended or adjusted under 35 U.S.C. 154(b) by 108 days.

(21) Appl. No.: 15/490,165

(22) Filed: Apr. 18, 2017

(65) Prior Publication Data
US 2018/0297861 A1 Oct. 18, 2018

(51) Int. Cl.
*C02F 1/46* (2006.01)
*C02F 1/52* (2006.01)
*C02F 1/00* (2006.01)

(52) U.S. Cl.
CPC .............. *C02F 1/4602* (2013.01); *C02F 1/52* (2013.01); *C02F 2001/007* (2013.01); *C02F 2201/46125* (2013.01); *C02F 2209/05* (2013.01); *C02F 2301/043* (2013.01); *C02F 2303/20* (2013.01); *C02F 2307/14* (2013.01)

(58) Field of Classification Search
CPC .... C02F 1/4602; C02F 1/52; C02F 2001/007; C02F 2201/46125; C02F 2209/05; C02F 2301/043; C02F 2303/20; C02F 2307/14
See application file for complete search history.

(56) References Cited

U.S. PATENT DOCUMENTS

| | | | |
|---|---|---|---|
| 2,120,634 A * | 6/1938 | Stevenson | C02F 1/5236 210/713 |
| 3,752,747 A * | 8/1973 | Treharne et al. | C02F 1/467 119/200 |
| 4,769,119 A | 9/1988 | Grundler | |
| 4,776,384 A | 10/1988 | Kawabe et al. | |
| 4,869,016 A | 9/1989 | Diprose et al. | |
| 4,986,906 A | 1/1991 | Dadisman | |
| 5,389,214 A | 2/1995 | Erickson et al. | |
| 6,183,646 B1 | 2/2001 | Williams et al. | |
| 6,627,053 B2 * | 9/2003 | Hirota | C02F 1/46104 204/228.1 |
| 7,387,719 B2 * | 6/2008 | Carson | A61L 2/0011 204/252 |
| 8,968,575 B2 * | 3/2015 | Zolotarsky | B63J 4/002 114/125 |

(Continued)

OTHER PUBLICATIONS

Turcotte et al., Copper Ion Generators and the control of Quagga Mussels, Sep. 2009, pp. 1-12 (Year: 2009).*

(Continued)

*Primary Examiner* — Patrick Orme
(74) *Attorney, Agent, or Firm* — Armstrong Teasdale LLP

(57) ABSTRACT

A method of managing ionization for biofouling control in a water intake system that includes channeling a supply water stream through an electrochemical cell, monitoring at least one parameter of the supply water stream, determining an ion concentration threshold for the supply water stream based on the at least one parameter, and controlling the electrochemical cell such that ions are discharged into the supply water stream. The electrochemical cell is controlled such that an ion concentration of a treated water stream discharged from the electrochemical cell is greater than the ion concentration threshold.

20 Claims, 2 Drawing Sheets

(56) References Cited

U.S. PATENT DOCUMENTS

2004/0254682 A1* 12/2004 Kast ................ C02F 3/1294
    700/265
2010/0219082 A1*  9/2010 Diaz Gonzalez Alcocer ..............
    C02F 1/463
    205/743
2015/0284275 A1* 10/2015 Ongeche ............... C02F 1/4602
    210/668

OTHER PUBLICATIONS

"Biotic Ligand Model and Copper Criteria," Water Quality Standards Academy, Office of Science and Technology, Office of Water, US Environmental Protection Agency Publication #820Q16001; Mar. 2016; 17 pp.

* cited by examiner

METHOD OF MANAGING IONIZATION FOR BIOFOULING CONTROL IN FRESH RAW WATER INTAKES

FIELD OF THE DISCLOSURE

The present disclosure relates generally to methods, devices, processes, and systems that inhibit fouling in raw water intake systems. More specifically, the present disclosure describes an ionization system for use in inhibiting biofouling due to mussels, clams, bryozoan, and other mollusks in fresh raw water intake systems.

BACKGROUND OF THE DISCLOSURE

In recent years the spread of biofoulants such as zebra mussels, quagga mussels, Asiatic clams, and bryozoan have infested fresh water bodies resulting in clogging of water intake systems of municipal, industrial, power plant, and irrigation water systems. These biofoulants cause financial and operational hardships by impeding water flow, introducing additional organic contamination into the water systems, decreasing cooling efficiency of heat transfer equipment, causing premature damage to pumps, and promoting accelerated degradation of water conveyance equipment.

Dissolution of metals to produce metal ions is a process that has been used to inhibit macrofouling in at least some known water systems. For instance, copper, zinc, and aluminum ionization systems have been used to control the buildup of mussels, bryozoan, clams, and slime in a marine environment such as in the water intake system of seafaring vessels, seawater offshore drilling platforms, or seawater desalination plants. However, because seawater has a lower electrical resistance than fresh raw water, at least some known water systems are not suitable or readily adaptable for use in inhibiting fouling in fresh raw water systems such as municipal, power, and industrial plants.

The ionization efficiency of fresh raw water can be improved by increasing the number and/or the size of electrodes in the water system. However, increasing the number and/or the size of electrodes facilitates increasing the acquisition costs, operational costs, weight, installation, and maintenance requirements of such a system. In addition, inter-electrode resistance in fresh raw water can vary widely among different water sources due to changes in water conductivity, deposit formation on electrodes, the age of electrodes, and electrode spacing, for example. As such, it may be difficult to maintain consistent ion dosing in treated water.

For example, the water conductivity of fresh raw water is based at least partially on properties of the fresh raw water. The properties of fresh raw water may change drastically throughout the day due to changes in weather, wind, rain, and/or activities around the water intake facility such as dredging and boating. At least some known ionization systems are focused on channeling a constant current to ionization electrodes, or producing a constant amount of ions, to compensate for variations in water conductivity. However, other factors may impact the effectiveness of the ions dissolved in the fresh raw water in inhibiting biofouling.

Therefore, there is a need for a process, system, and device for effective, efficient, cost-effective, and eco-friendly management of ionization for precise, consistent, and adequate delivery of ion dosing for control of biofouling in fresh raw water intake systems.

BRIEF DESCRIPTION

In one aspect, a method of managing ionization for biofouling control in a water intake system is provided. The method includes channeling a supply water stream through an electrochemical cell, monitoring at least one parameter of the supply water stream, determining an ion concentration threshold for the supply water stream based on the at least one parameter, and controlling the electrochemical cell such that ions are discharged into the supply water stream. The electrochemical cell is controlled such that an ion concentration of a treated water stream discharged from the electrochemical cell is greater than the ion concentration threshold.

In another aspect, a method of managing ionization for biofouling control in a water intake system is provided. The method includes intaking untreated fresh water, channeling a first portion of the untreated fresh water towards a salt tank, wherein a brine stream formed from the first portion of the untreated fresh water is discharged from the salt tank. The method also includes channeling a second portion of the untreated fresh water towards an electrochemical cell to define a supply water stream, monitoring at least one parameter of the supply water stream, and selectively channeling the brine stream towards the electrochemical cell such that a salinity of the supply water stream is increased. A flow rate of the brine stream is varied as a function of the at least one parameter.

In yet another aspect, a water intake system is provided. The system includes an electrochemical cell configured to receive a supply water stream and at least one water sensor positioned upstream from the electrochemical cell. The at least one water sensor is configured to monitor at least one parameter of the supply water stream channeled towards the electrochemical cell. A power supply is electrically coupled to the electrochemical cell, and a controller is electrically coupled to the at least one water sensor and the power supply. The controller is configured to control a power output supplied to the electrochemical cell such that an amount of ions discharged into the supply water stream is varied as a function of the at least one parameter.

DRAWINGS

DETAILED DESCRIPTION

Figure 1:
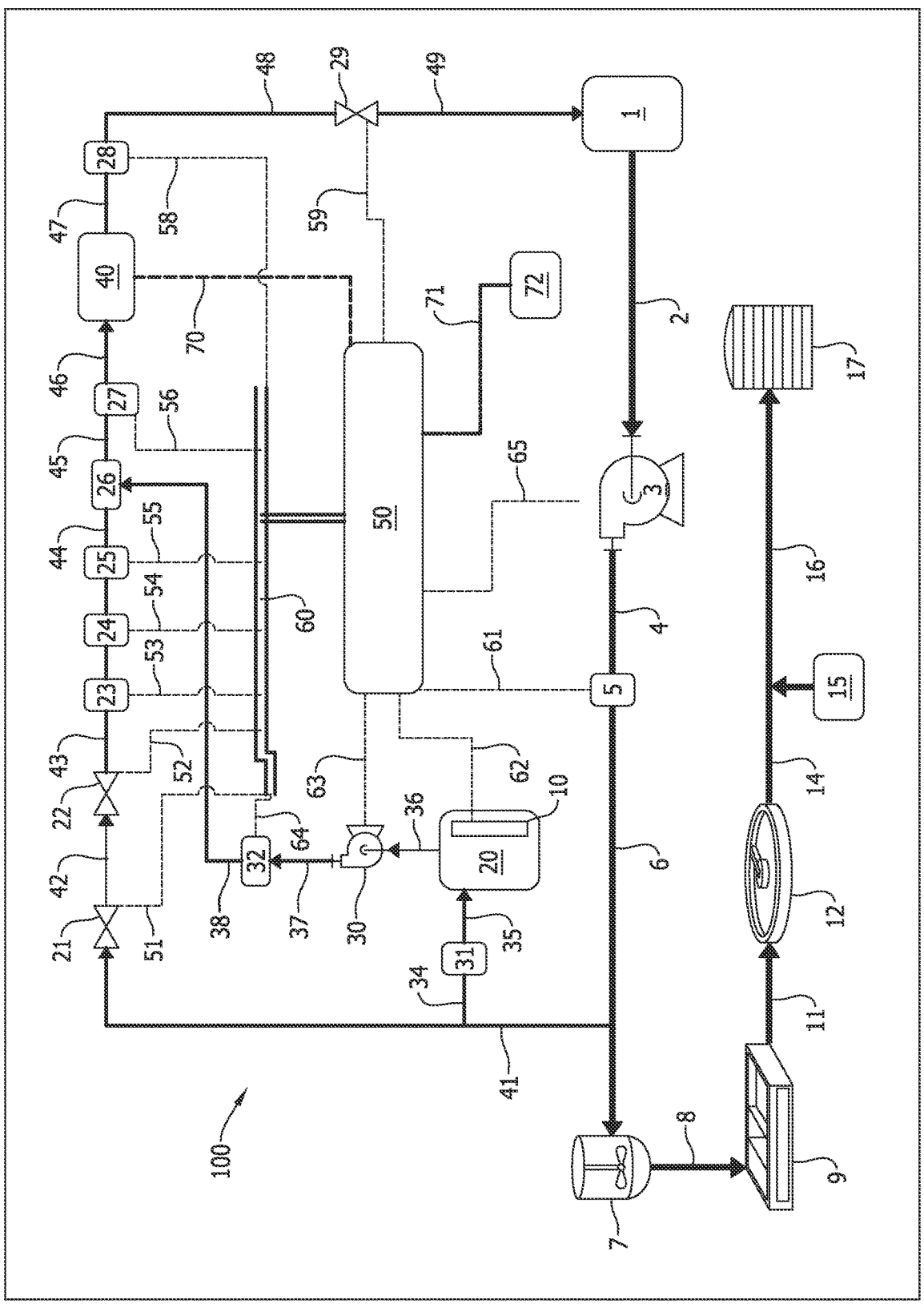
FIG. 1 is a schematic diagram of an exemplary raw water intake system.

The present disclosure is directed to a process, method, and device for use in inhibiting biofouling in fresh raw water treatment systems (hereinafter referred to as a "water intake"). The present disclosure is also directed to providing processes, systems, means and devices for treating water fouling. The present disclosure is not only suitable for use against a single type of fouling, but also can be utilized to treat multiple types of fouling.

Systems and Processes for Treating Biofouling in Water

The present disclosure is directed at a process, method and device for managing ionization and for controlling fouling in raw water intake system.

The process includes at least one of: intaking untreated fresh raw water at a fresh raw water intake; channeling some of the water from the fresh raw water intake towards a salt tank and then to an injector to define a flow of brine water; channeling some of the water from raw water intake to the injector to define flow of supply water and combining the supply water with the brine water upstream of an electrochemical cell (also referred to herein as a "cell") to define a flow of carrier water, channeling the carrier water to the cell that includes at least one anode and at least one cathode; controlling an amount of power provided to the cell from a power supply to ionize the carrier water; channeling ionized water towards the fresh raw water intake; and combining untreated fresh raw water with the ionized water at the fresh raw water intake to define a flow of treated raw water with a reduced propensity to fouling.

The process also includes sequentially channeling the treated raw water through a water intake pipe and through at least one raw water pump to pressurize treated water; channeling treated water to at least a flocculation tank; adding flocculants and coagulants to the treated water to cause suspended particles, organic matter, inorganic matter, dissolved matter, and undissolved matter to agglomerate, and to cause some ions in the treated water to precipitate and agglomerate; channeling the coagulated/flocculated treated water to a sedimentation tank; separating agglomerated and flocculated particles from the treated water to increase the cleanliness of treated water; channeling the cleaner treated water to a clarifier tank to further separate the agglomerated and flocculated particles, thereby increasing the clarity of the treated water; and channeling the now clarified and treated water to a storage tank while injecting a disinfectant to preserve the quality of clarified and treated water.

The present disclosure is also directed to a system for use in inhibiting biofouling in fresh raw water system. The system includes at least one of: a raw water intake for intaking fresh raw water; a salt tank; an electrochemical cell having a plurality of electrodes, a source of power electrically coupled to the electrodes; a delivery system operable to channel some of the water from the raw water intake through a salt tank and to an injector to produce a brine water flow; a delivery system operable to channel some of the water from the fresh raw water intake to the injector upstream of the cell to define a flow of supply water; combining the supply water with the brine water upstream of the cell at the injector to define carrier water, channeling the carrier water to the cell, and controlling an amount of power provided to the cell to infuse the carrier water with metal ions to produce a flow of ionized, treated water. The amount of power provided to the cell is based at least partially on the turbidity, conductivity, pH, alkalinity, hardness, dissolved organic carbon, suspended solids, and temperature of raw water, for example. The ionized water is then channeled to the raw water intake, the ionized water is combined with untreated raw water to define treated water, and the delivery system is operable to channel the treated water from the water intake throughout the raw water treatment system to facilitate inhibiting biofouling in the water system.

The present disclosure is also directed to a method for use in ionizing fresh raw water. The method includes the automatic steps of combining some fresh raw water and brine water to form carrier water, channeling the carrier water to an electrochemical cell, ionizing the carrier water to produce metal ions, automatically detecting the cleanliness of ionization cell, automatically cleaning the electrochemical cell when a dirty ionization cell is detected such that ionization cell cleanliness is restored.

The present disclosure is also directed to an electrochemical cell device for use in inhibiting fouling in fresh raw water systems. The device includes at least one of: a cell container including at least one water inlet and at least one water outlet; and a device for connecting at least one anode and at least one cathode of the cell to a power source. The anode and the cathode may be fabricated from any material that enables the system to function as described herein. Example materials include, but are not limited to, copper, aluminum, and zinc. In one embodiment, the amount of power provided to the cell from the power source is controlled to provide adequate and consistent dosing to the carrier water.

It should be understood that adequate and consistent dosing does not mean merely maintaining a generally constant concentration (or range of concentration) of ions in treated water but rather managing the release of cations in a controlled and efficient manner based on fresh raw water conditions. Adequate and consistent dosing therefore takes in to consideration at least four aspects; 1) raw water parameters such as chemical and physical conditions of water including, but not limited to, water temperature, 2) life cycle (growth stage) of biofoulants, 3) time of the year, and 4) predicted toxicity of Cations. These and other aspects will be discussed in further detail below.

Referring to FIG. 1, an exemplary raw water intake system 100 in accordance with present disclosure is shown. In the system 100, a water intake structure 1 is located in a fresh raw water source such as a lake, reservoir, dam, river, or another water body susceptible to fouling. Fresh raw water intake structure 1 intakes untreated fresh raw water causing it to flow through a pipe 2 when a fresh raw water pump is in operation. Alternatively, water is channeled through pipe 2 without the use of fresh raw water pump 3. For example, in some embodiment, of the present disclosure, the design and location of fresh raw water intake structure 1 may allow water to flow through pipe 2 due to gravity.

Fresh raw water pump 3 pressurizes and discharges untreated fresh raw water through a pipe 4 and through a fresh raw water flow detecting sensor 5. The untreated fresh raw water is then channeled towards and enters a coagulating tank 7 through a pipe 6. In coagulating tank 7, chemical coagulants and flocculants are added to the untreated fresh raw water and the combination is stirred causing suspended particles in raw water to agglomerate making them larger, denser, and more prone to settlement. The coagulated/flocculated water is then channeled through a pipe 8 and enters a sedimentation tank 9. Sedimentation tank 9 facilitates separating coagulated/flocculated particles from the untreated fresh raw water, and the particles settle at the bottom of sedimentation tank 9. The water is discharged from sedimentation tank 9 and then channeled through a pipe 11 towards a clarifier basin 12 where more coagulated/flocculated particles are separated from the clarified water and settled at the bottom of clarifier basin 12. The now clarified water flows through a pipe 14 while an oxidant disinfectant injector 15 discharges an oxidant disinfectant for mixing with and disinfecting the clarified water. The disinfected water flows through a pipe 16 for storage in a disinfected water tank 17.

Continuous admission of fresh raw water in to water intake structure 1 may cause fouling of fresh raw water system if the source of fresh raw water is infested with foulants such as zebra mussels, quagga mussel, clams, bryozoans, and mollusks in general. Fouling of fresh raw water intake systems reduces water flow capacity, damages equipment, increases water treatment costs and negatively impact quality of treated water.

In the example embodiment of the present disclosure, some of the water from fresh raw water intake 1 flowing through pipe 6 is channeled towards an injector 26 to define a flow of supply water. Supply water is any water channeled through a pipe 41, through an inlet valve 21, a pipe 42, a check valve 22, and a pipe 43. In addition system 100 includes a raw water sensor 23, a supply water flow detecting sensor 24, a first conductivity sensor 25, and a second conductivity sensor 27 (hereinafter collectively referred to as "water sensor(s)". After passing through these respective valves (21, 22) and sensors (23, 24, 25, and 27), supply water flows through a pipe 44, through injector 26, through a pipe 45, and through second conductivity sensor 27 via pipe 46 towards an electrochemical cell 40. In cell 40, current is supplied to cell 40 from a power supply 50 causing the release of metal ions, metal hydroxides, and their complexes into the supply water flowing therethrough.

For the sake of brevity, the aforementioned moieties, metal ions, metal hydroxides and their complexes, released in water flowing through cell 40 would be referred to herein after as cations. For the sake of brevity, the process of channeling water into to cell 40 and then supplying current to the electrodes of cell 40, thereby causing anodic dissolution of the electrodes and release of cations in water, is referred to herein after as ionization or to ionize. For the sake of brevity water containing cations as a result of ionization is herein after referred to as ionized water.

In the example embodiment, ionized water is discharged from cell 40 through a pipe 47 and through an ionized water sensor 28. The ionized water is then channeled through a pipe 48, through an outlet valve 29, and then through a pipe 48 and finally introduced to fresh raw water intake structure 1. Ionized water and untreated fresh raw water are then mixed together, forming treated water, and the presence of cations in the treated water facilitates inhibiting fouling in system 100 as treated water is channeled therethrough.

Figure 2:
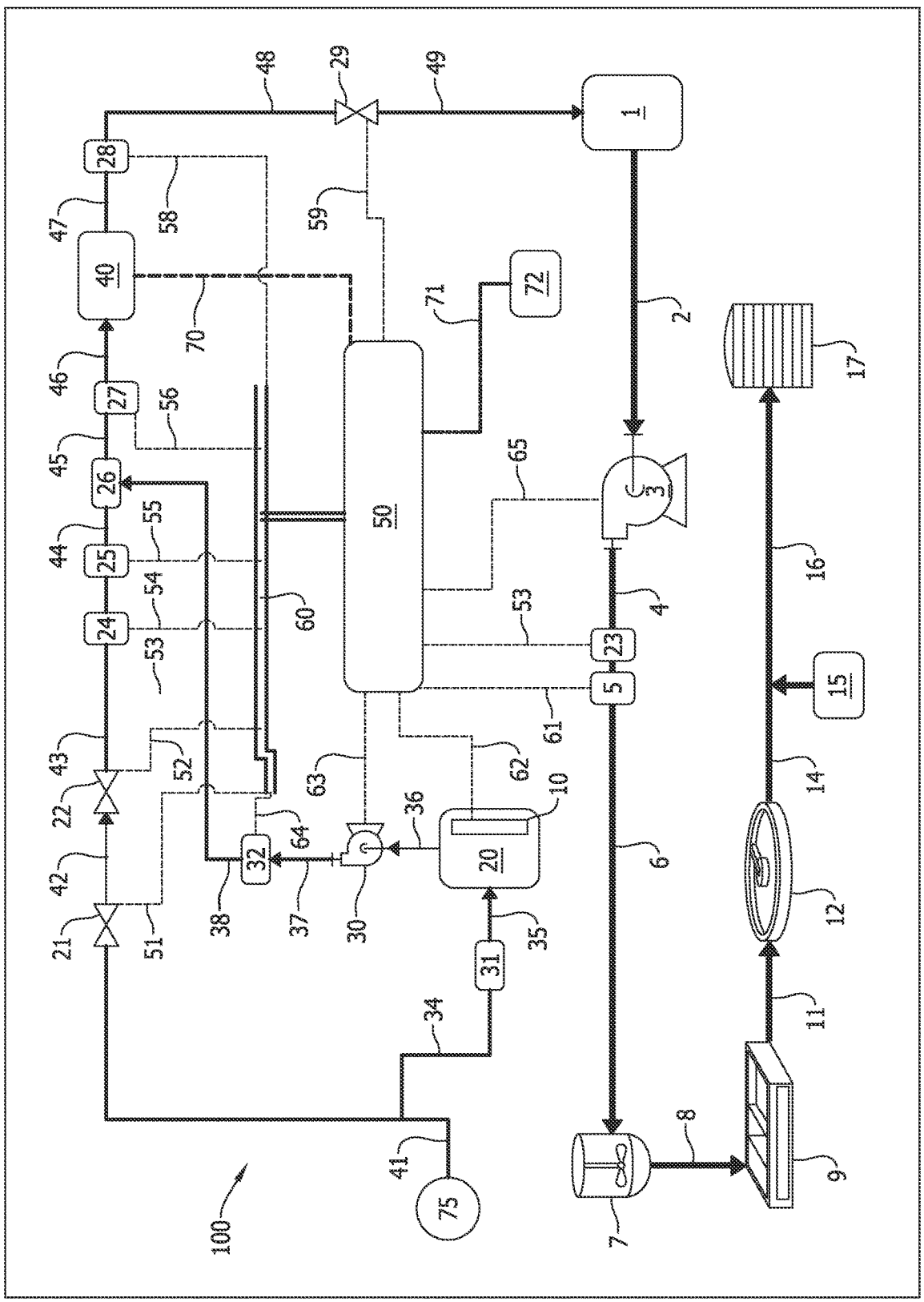
FIG. 2 is a schematic diagram of an alternative water intake system.

Referring to FIG. 2, in the example embodiment of the present disclosure, system 100 includes a source 75 of water such as a lake, a municipal water body, a river, or a well. The water from source 75 flows through pipe 41 and is channeled towards injector 26 to define a flow of supply water. After passing through respective valves (21 and 22) and sensors (24 and 25), supply water flows through pipe 44, through injector 26, through pipe 45, through a sensor 27, through pipe 46 towards electrochemical cell 40. In cell 40, current is supplied to cell 40 from a power supply 50 causing release of metal ions, metal hydroxides, and their complexes in the supply water flowing through.

Referring to FIG. 1 and FIG. 2, in some embodiments of the present disclosure, a first portion of the supply water, upstream of valve 21, is channeled through pipe 34, through combination valve/sensor 31, through pipe 35, and towards a salt tank 20 to define a flow of makeup water. The makeup water is combined with salt in salt tank 20, thereby creating brine water. The brine water is discharged from salt tank 20 through pipe 36 towards brine pump 30, which discharges the brine water through pipe 37 and towards a combination brine valve/sensor 32. The brine water is then channeled through a pipe 38 towards injector 26 for combining with supply water to define carrier water. The carrier water is then channeled through pipe 45, through sensor 27, and through pipe 46 towards electrochemical cell 40. When current is supplied to cell 40 from power supply 50, cations are released and the carrier water is ionized. The presence of the brine water in the carrier water increases ionization efficiency, reduces and/or eliminates formation of scale, inhibits cell plugging, enhances the release of cations, lowers an amount of power required to ionize water, and ameliorates or eliminates the negative effects of raw water caprice.

In the example embodiment, ionized water is discharged from cell 40 through a pipe 47, and is channeled through sensor 28, through pipe 48, through outlet valve 29, and then through pipe 49 for introduction into fresh raw water intake structure 1. The ionized water and the untreated fresh raw water mix together forming treated water. The presence of cations inhibits fouling within system 100 as the treated water is channeled therethrough. The now treated water flows through pipe 2 and is pressurized by and discharged from raw water pump 3. The treated water is then channeled through pipe 4, through a raw water sensor 23, through a raw water flow detecting sensor and into coagulating tank 7 via pipe 6 and proceeds in the manner described in FIG. 1 above.

Treatment of raw water may be intensified and targeted to coincide with when foulants are more active or in their most vulnerable growth stages. For example, the treatment of water may be based at least partially on the time of year, the temperature of the water at the particular time of year, and the life cycle and growth stage of the biofoulants as a function of the water temperature.

In some embodiments of the present disclosure fresh raw water pump 3 is electrically coupled to and communicates with Power supply 50 via electrical line 65. A Controller 72 is electrically coupled to, controls, and communicates with power supply 50 via electrical line 71, and at least one sensor of system 100, to control a power output supplied to cell 40 such that an amount of ions discharged into the supply water stream or the carrier water stream is varied as a function of at least one parameter of the water, as will be described in more detail below.

In accordance with one aspect of the present disclosure power supply 50 controls the rate of fresh raw water flow.

In accordance with one aspect of the present disclosure fresh raw water pump 3 communicates the rate of fresh raw water flow to power supply 50.

In some embodiment of the present disclosure a plurality of fresh raw water pumps 3 is present. In accordance with one aspect of the present disclosure a plurality of raw water pumps is electrically coupled to and communicates with power supply 50 via a plurality of an electrical line 65.

Referring to FIG. 2, fresh raw water pump 3 pressurizes fresh raw water causing it to flow through pipe 4 and through water sensor 23 that is electrically coupled to and communicates with power supply 50 via an electrical line 53. Water sensor 23 may be a turbidimeter, conductivity meter, or any sensor or combination of sensors known capable of detecting a parameter of the water such as pH, suspended solids, dissolved solids, turbidity, alkalinity, hardness, temperature, salinity, calcium level, dissolved organic carbon, water discoloration, presence of foulants, light absorbance associated with water.

In accordance with one aspect of the present disclosure, power supply 50 is configured to increase power to cell 40 proportional to an increase in at least one water parameter associated with water sensor 23.

In accordance with one aspect of the present disclosure, power supply 50 is configured to decrease power proportional to a decrease in at least one water parameter associated with water sensor 23.

In accordance with one aspect of the present disclosure power supply 50 is configured to maintain a constant power to cell 40 as at least one parameter associated with water sensor 23 increases.

In accordance with one aspect of the present disclosure power supply 50 is configured to maintain a constant power to cell 40 as at least one parameter associated with water sensor 23 decreases.

Water sensor 23 detects and communicates the condition of untreated fresh raw water to controller 72, and controller 72 controls, monitors, and manages the fouling control process.

Referring to FIG. 1 and FIG. 2, fresh raw water flow detecting sensor 5 is electrically coupled to and communicates with power supply 50 via an electrical line 61. Fresh raw water flow detecting sensor 5 is a flow meter, a pressure sensor, a flow switch, or any combination thereof capable of detecting the flow rate, presence or absence of water, pressure, conductivity, temperature, differential pressure, and/or direction of flow of raw water.

In accordance with one aspect of the present disclosure, power supply 50 is configured to increase power to cell 40 proportional to a change in at least one parameter associated with raw water flow detecting sensor 5.

In accordance with one aspect of the present disclosure, power supply 50 is configured to increase power to cell 40 proportional to flow rate of raw water.

In accordance with one aspect of the present disclosure, power supply 50 is configured to decrease power to cell 40 proportional to a change in at least one parameter associated with raw water flow detecting sensor 5.

In accordance with one aspect of the present disclosure, power supply 50 is configured to decrease power to cell 40 proportional to decrease in flow rate of raw water.

In accordance with one aspect of the present disclosure, power supply 50 is configured to shut off power to cell 40 if the flow rate of raw water is outside a predetermined operator adjustable range.

Referring to FIG. 1, after flowing through fresh raw water flow detecting sensor 5, untreated fresh raw water flows through pipe 6, and a portion of the untreated fresh raw water is channeled through pipe 41. A second portion of the untreated fresh raw water is channeled towards coagulating tank 7, as described above. Alternatively, as shown in FIG. 2, all of the untreated fresh raw water flowing through pipe 6 is channeled towards coagulating tank 7. Clarified water and disinfected water are then formed, as described above.

Referring to FIG. 1, in some embodiments of the present disclosure, a first portion of the untreated fresh raw water channeled from intake structure 1 and channeled through pipe 41 is channeled towards injector 26 to define a flow of supply water.

In some embodiments of the present disclosure, a second portion of the untreated fresh raw water is channeled from intake structure 1, through a combination valve/sensor 31, through pipe 35, and into salt tank 20 to define a flow of makeup water.

Referring now to FIG. 2, in some embodiments of the present disclosure the source of supply water and makeup water is separate from the source of untreated fresh raw water such as a lake, river, pond, finished municipal water, rain water, recycled water, recovered condensate, and such.

In accordance with one aspect of the present disclosure, the supply water and the makeup water flows may be channeled from different and or separate sources.

In accordance with one aspect of the present disclosure, the source of makeup water may be reverse osmosis water, sea water, recovered steam, distillate water, condensate water, rain, pond, snow melt, or filtrate water, and/or any combination thereof.

Referring to FIG. 1 and FIG. 2, inlet valve 21. is provided for convenient functioning of the process, system, and device. Inlet valve 21 may be automatic, electric, pneumatic, or manually operated. Inlet valve 21 may be selectively closed to prevent downstream water flow, or may be partially open to regulate water flow towards downstream components. Inlet valve 21 is electrically coupled to and in communication with power supply 50 via electrical line 51, which is partly sheathed within an electrical conduit 60. Controller 72 and power supply 50 control the opening and closing of inlet valve 21 to regulate the flow of supply water therethrough. Inlet valve 21 may be a flow control valve, a modulating valve, a proportional control valve, a pressure regulating valve, a shut off valve, and/or a combination thereof.

In accordance with one aspect of the present disclosure controller 72 and power supply 50 command inlet valve 21 to shut off flow of supply water when raw water flow detecting sensor 5 detects raw water flow is outside a predetermined operator adjustable range.

Referring to FIG. 1 and FIG. 2, supply water is discharged from inlet valve 21 and towards check valve 22. Check valve 22 functions to allow supply water to flow only in a downstream direction towards cell 40. Check valve 22 may be a variable flow booster pump that is electrically coupled to, controlled by, and in communication with power supply 50 via electrical line 52. Electrical line 52 is partially sheathed in electrical conduit 60. A booster pump (not shown) may function to pressurize supply water and enable injection of ionized water into water intake structure 1 and or at a convenient point along raw water treatment system. Power supply 50 may regulate the speed of the booster pump to maintain supply water flow, flow rate, and/or pressure at a predetermined operator adjustable range. Power supply 50 may regulate the speed of booster pump to maintain supply water flow, flow rate, and/or pressure to regulate the residence time of water in cell 40 at a predetermined operator adjustable duration.

In accordance with one aspect of present disclosure, inlet valve 21 and check valve 22 work cooperatively to regulate the flow and or pressure of supply water.

The now regulated supply water flows via pipe 43 and through supply water sensor 23. Supply water sensor 23 is electrically coupled with, powered by, and in communication with power supply 50 via electrical line 53, which is partially sheathed within electrical conduit 60.

Supply water sensor 23 may be at least a turbidimeter, conductivity meter, or any sensor or combination of sensors capable of detecting a water parameter such as pH, suspended solids, dissolved solids, turbidity, alkalinity, hardness, temperature, salinity, calcium level, dissolved organic carbon, water discoloration, presence of foulants, light absorbance associated with supply water.

In accordance with one aspect of the present disclosure, power supply 50 is configured to increase power to cell 40 proportional to an increase in at least one water parameter associated with supply water sensor 23.

In accordance with one aspect of the present disclosure, power supply 50 is configured to decrease power proportional to a decrease in at least one water parameter associated with supply water sensor 23.

In accordance with one aspect of the present disclosure, power supply 50 is configured to maintain a constant power to cell 40 as at least one parameter associated with supply water sensor 23 increases.

In accordance with one aspect of the present disclosure, power supply 50 is configured to maintain a constant power to cell 40 as at least one parameter associated with supply water sensor 23 decreases.

In accordance with one aspect of the present disclosure, at least one parameter is associated with supply water.

In accordance with one aspect of the present disclosure, the at least one parameter associated with supply water is pH, suspended solids, dissolved solids, turbidity, alkalinity, hardness, temperature, salinity, calcium level, water discoloration, presence of foulants, dissolved organic carbon and or light absorbance of supply water.

In accordance with one aspect of the present disclosure, supply water sensor 23 detects, monitors, and communicates chemical and physical parameters of supply water to controller 72, which controls, monitors, and manages fouling control process according to supply water parameters.

In accordance with one aspect of the present disclosure, supply water sensor 23 may be a turbidimeter, a conductivity meter, or any sensor or combination of sensors capable of detecting a parameter such as pH, suspended solids, dissolved solids, turbidity, alkalinity, hardness, temperature, salinity, calcium level, dissolved organic carbon, water discoloration, presence of foulants, and light absorbance associated with fresh raw water.

Referring to FIG. 1 and FIG. 2, after flowing through supply water sensor 23, the regulated supply water flows through supply water flow detecting sensor 24. Supply water flow detecting sensor 24 is electrically coupled to, and in communication with, power supply 50 via electrical line 54, which is partially sheathed within electrical conduit 60. Supply water flow detecting sensor 24 detects the presence or absence of supply water, and measures, monitors, and communicates supply water flow, flow rate, volume, pressure, temperature, direction of flow, and combinations thereof to controller 72.

In accordance with one aspect of the present disclosure, supply water flow detecting sensor 24 can be a flow meter, pressure sensor, flow switch, or a combination thereof capable of detecting the flow rate, volume of water, presence or absence of supply water, pressure, conductivity, temperature, differential pressure, and or direction of the flow of supply water.

In accordance with one aspect of the present disclosure, power supply 50 is configured to increase power to cell 40 proportional to a change in at least one parameter associated with supply water flow detecting sensor 24.

In accordance with one aspect of the present disclosure, power supply 50 is configured to increase power to cell 40 proportional to flow rate of supply water. In accordance with one aspect of the present disclosure, power supply 50 is configured to decrease power to cell 40 proportional to a change in at least one parameter associated with supply water flow detecting sensor 24.

In accordance with one aspect of the present disclosure, at least one parameter is associated with supply water flow detecting sensor 24.

In accordance with one aspect of the present disclosure, supply water flow detecting sensor 24 measures, detects, monitors, and communicates the flow rate, volume of water, presence or absence of supply water, pressure, conductivity, temperature, differential pressure, and/or direction of the flow of supply water.

In accordance with one aspect of the present disclosure, power supply 50 is configured to decrease power to cell 40 proportional to decrease in the flow rate of supply water.

In accordance with one aspect of the present disclosure, controller 72 is configured to shut off power to cell 40 if the flow rate of supply water is outside a predetermined operator adjustable range.

In accordance with one aspect of the present disclosure, supply water flow detecting sensor 24 is, for example, a flow meter such as a magnetic inductive flow meter and an ultrasonic flow meter.

In accordance with one aspect of the present disclosure power supply 50 is configured to maintain a constant flow rate of supply water.

Referring to FIG. 1 and FIG. 2, supply water is channeled through a first conductivity sensor 25. First conductivity sensor 25 is electrically coupled to and in communication with power supply 50 through electrical wire 55, which is partially sheathed within electrical conduit 60. First conductivity sensor 25 measures the conductivity of supply water upstream of injector 26.

In accordance with one aspect of the present disclosure, first conductivity sensor 25 is a temperature compensated conductivity sensor, a toroidal type conductivity sensor, or a temperature compensated toroidal conductivity sensor, which is resistant to foulants in raw water.

In the example embodiment, supply water exits first conductivity sensor 25 via pipe 44 and is channeled towards injector 26, whose functions will be described in further detail below. Water discharged from injector 26 is channeled towards second conductivity sensor 27, which is electrically coupled to and in communication with power supply through electrical wire 56, which is partially sheathed within electrical conduit 60. Second conductivity sensor 27 measures the conductivity of water downstream of injector 26.

In accordance with one aspect of the present disclosure second conductivity sensor 27 is a temperature compensated conductivity sensor, a toroidal type conductivity sensor, or a temperature compensated toroidal conductivity sensor, which is resistant to foulants in raw water.

Conductivity sensors 25 and 27 measure, monitor, and compare conductivity differences (i.e., a differential conductivity) of water upstream and downstream of injector 26.

Water discharged from second conductivity sensor 27 is channeled towards electrochemical cell 40, and is ionized therein.

In accordance with one aspect of the present disclosure, controller 72 receives data regarding real-time, near real-time, and/or about real-time conditions of water from electrically coupled components (i.e., sensors, valves, electrochemical cell, pumps, power supply) and in real-time, near real-time, and/or about real-time dynamically varies power to cell 40 to release of cations for adequate and consistent dosing of fresh raw water system.

Referring to FIG. 1 and FIG. 2, as described above, the second portion of untreated fresh raw water channeled through pipe 34, through combination valve/sensor 31, and into salt tank 20 defines flow of makeup water. Combination valve/sensor 31 may include a flow control valve, a modulating valve, a proportional control valve, a pressure regulating valve, a shut-off valve, and/or any combination thereof. Combination valve/sensor 31 may also include a flow meter, a pressure sensor, a flow switch, or any combination thereof capable of detecting the flow rate, volume of water, presence or absence of water, pressure, conductivity, temperature, differential pressure, and or direction of flow of the makeup water. Combination valve/sensor 31 is electrically coupled to and in communication with power supply 50 and controller 72. Combination valve/sensor 31 is operable to control intake of makeup water into salt tank 20, and to communicate data about the condition of the makeup water to controller 72.

In the example embodiment, upon entering salt tank 20, the makeup water mixes with salt to form brine water. As used herein, "salt" may refer to any generally water miscible substance capable of mixing with, dissolving in, and/or being suspended in water thereby altering the pH, conductivity, Total Dissolved Solids (TDS), Dissolved Organic Carbon (DOC), Dissolved Oxygen (DO), Oxidation Reduction Potential (ORP), or Total Suspended Solids (TSS) of water.

In accordance with one aspect of the present disclosure, salt contained within salt tank 20 may be an oxidant, halide salt, copper salt, copper citrate, HCL, $H_3PO_5$, mineral acid, liquid brine, halide gas, nitric acid, anti-scalant, and/or a combination thereof. In one embodiment, the salt is chloride, bromide, iodide, and/or a combination thereof. In one embodiment, the salt is sodium chloride. Sodium chloride is cheap, readily available and dissolves quickly in water.

In accordance with one aspect of the present disclosure, salt in salt tank 20 may be a potassium chloride salt. Potassium chloride is relatively cheap, readily available, dissolves quickly, and is popular in water treatment. The use of potassium chloride salt may be less objectionable and more advantageous in comparison to other salts in that potassium is an antifoulant against quagga and zebra mussels.

Salt sensor 10 located within salt tank 20 is electrically coupled to and in communication with power supply 50 via electrical line 62. Salt sensor 10 measures and monitors the amount of salt, the water level, the brine level, and the brine conductivity within salt tank 20. In operation, power supply 50 is operable to selectively open or close combination valve/sensor 31 to regulate the water level in salt tank 20. If the salt level in salt tank 20 is below or above a predefined user adjustable threshold, power supply 50 may trigger an alarm to alert an operator. Brine water (i.e., the combination of makeup water and salt) is discharged from salt tank 20 via pipe 36, such as when power supply 50 actuates brine pump 30. Brine pump 30 is electrically coupled to and in communication with power supply 50 through electrical wire 63.

In accordance with one aspect of the present disclosure brine pump 30 is a constant flow pump or a variable flow pump.

Brine pump 30 pressurizes and discharges brine water through pipe 36, through brine flow sensor 32, through pipe 38, and towards injector 26. Brine flow sensor 32 may be a flow meter, a pressure sensor, a salometer, a pH sensor, an ORP sensor, a flow switch, or any combination thereof, capable of detecting the flow rate, volume of water, presence or absence of brine water, pressure, conductivity, temperature, pH, Oxidation Reduction Potential (ORP), salinity, differential pressure, and or direction of flow of the brine water.

Brine flow sensor 32 may be configured to measure the conductivity of the brine water, and power supply 50 is configured to alert an operator when the conductivity of brine water is outside a predefined user adjustable threshold. Brine water flow detecting sensor 32 is electrically coupled to and in communication with power supply 50 via electrical line 64, which is partially sheathed within electrical conduit 60.

Brine water flow detecting sensor 32 may be, but is not limited to, a flow meter such as a magnetic inductive flow meter and an ultrasonic flow meter.

In an alternative embodiment, brine pump 30 is replaced by a modulating valve, such as in embodiments where injector 26 is an educator, such as a Venturi injector. Brine water flow is induced when supply water flows through the Venturi injector.

In an alternative embodiment, brine pump 30 is replaced by an actuated valve, an electric valve, or an electric modulating valve.

In accordance with one aspect of the present disclosure, injector 26 is an educator, an injector, a static mixer, and/or any combination of fluid mixers generally known in the art.

In accordance with one aspect of the present disclosure, the supply water channeled through injector 26 induces the flow of brine water, and power supply 50 and controller 72 regulates the flow rate of brine water into injector 26 by controlling the opening and closing of an electric modulating valve.

In the example embodiment, injector 26 mixes supply water with brine water to define carrier water. Mixing of supply and brine waters may change the aforementioned water parameters associated with them. As used herein, regulating carrier water refers to mixing of supply and brine water to attain a desired level of at least one common water parameter in the resultant mixture (i.e., carrier water).

Carrier water is discharged from injector 26 via pipe 45, and flows through second conductivity sensor 27 to enter cell 40 via pipe 46.

Sensors 23, 25, 27, 28 and 32 may measure a common differential parameter between at least two of supply water, carrier water, brine water, untreated fresh raw water and or ionized water. By way of non-limiting example, when conductivity is a common parameter, sensors 25, 27, 28 and 32 measure the difference in conductivity between carrier and supply water, between carrier and brine water, between supply and brine water, between carrier water and ionized water, between supply water and carrier water, and so forth.

In accordance with one aspect of the present disclosure the measured parameter is common to at least two of the water streams.

Ionization of Carrier Water

Referring to FIG. 1 and FIG. 2, when carrier water is channeled through cell 40, power supply 50 sends electrical power to cell 40 via an electrical line 70, thereby causing the carrier water to be ionized.

Carrier water ionization may include the automatic steps of, such as with controller 72, monitoring water conditions and parameters and detecting variations in the water conditions and parameters, automatically regulating carrier water, and dynamically varying power supplied to cell 40 to release cations in the carrier water as a function of the water conditions and parameters.

In accordance with one aspect of the present disclosure, a carrier water regulating step includes measuring, monitoring, and regulating flow, flow rate, pH, conductivity, ORP, volume, temperature, pressure, and/or combinations thereof, of supply water and brine water, combining supply water and brine water to produce carrier water, measuring, monitoring, and regulating at least conductivity, ORP, volume, temperature, flow rate, pressure, and/or combinations thereof, of carrier water by regulating flow and flow rate of supply water and/or brine water.

The automatic step of supplying power cell 40 may include measuring and monitoring ionization cell power, voltage, current, resistance, and/or combinations thereof.

The step also includes, in at least in real-time, near real-time, or about real-time, controlling the cell 40 to modulate cell power, voltage, and/or current as a function of water parameters associated with fresh raw water, supply water, brine water, carrier water and ionized water.

In one embodiment, as will be explained in more detail below, controller 72 determines an ion concentration threshold for the supply water stream, and controlling cell 40 such that an ion concentration of an ionized water stream discharged therefrom is greater than the ion concentration threshold. The ion concentration threshold is a threshold at which biofoulants within the supply water stream are neutralized when the ion concentration is greater than the ion concentration threshold.

In accordance with one aspect of the present disclosure, system 100 includes a plurality of cells 40 electrically coupled with power supply 50.

In accordance with one aspect of the present disclosure, variations in water parameters are detected by various sensors and communicated to controller 72. Power to cell 40 is then dynamically varied accordingly by power supply 50 and controller 72 to ionize carrier water and release ions for adequate and consistent dosing of untreated fresh raw water.

In accordance with one aspect of the present disclosure, when variations in supply water resistance (i.e., conductivity) are detected, power supply 50 and controller 72 dynamically vary the brine water flow rate, thereby varying the conductivity of the carrier water to compensate for variations in supply water resistance. As such, system 100 is capable of compensating for variations in the supply water resistance in a dynamic and responsive manner.

In accordance with one aspect of the present disclosure, when variations in electrode resistance in cell 40 are detected, power supply 50 and controller 72 dynamically vary the brine water flow rate, thereby varying the conductivity of carrier water entering cell 40 to compensate for variations in electrode resistance.

In accordance with one aspect of the present disclosure, when variations in raw water turbidity are detected, power supply 50 and controller 72 dynamically vary the brine water flow rate, thereby varying the conductivity of the carrier water. Power supply 5 also varies the amount of power to cell 40 to ionize the carrier water to release ions for adequate and consistent dosing of untreated fresh raw water in system 100.

In accordance with one aspect of the present disclosure, when variations in raw water turbidity are detected, power supply 50 and controller 72 dynamically vary the brine water flow rate, thereby varying the conductivity of the carrier water and varying an amount of power provided to cell 40 proportional to variations in the turbidity to ionize the carrier water to release ions for adequate and consistent dosing of the untreated fresh raw water in system 100.

In accordance with one aspect of the present disclosure, when variations in raw water parameters are detected, power supply 50 and controller 72 dynamically vary the brine water flow rate, thereby varying the conductivity of the carrier water and varying the amount of power provided to cell 40 to ionize the carrier water to release ions for adequate and consistent dosing of the untreated fresh raw water in system 100.

In accordance with one aspect of the present disclosure, when variations in light absorbance of fresh raw water are detected, power supply 50 and controller 72 dynamically vary the brine water flow rate, thereby varying the conductivity of the carrier water and varying the amount of power provided to cell 40 to ionize the carrier water to release ions for adequate and consistent dosing of the untreated fresh raw water in system 100.

In accordance with one aspect of the present disclosure, when variations in the level of suspended solids are detected in fresh raw water, power supply 50 and controller 72 dynamically vary the brine water flow rate, thereby varying the conductivity of the carrier water and varying the amount of power provided to cell 40 to ionize the carrier water to release ions for adequate and consistent dosing of the untreated fresh raw water in system 100.

In accordance with one aspect of the present disclosure, when variations in the level of suspended solids are detected in fresh raw water, power supply 50 and controller 72 dynamically vary the brine water flow rate, thereby varying the conductivity of the carrier water and varying the amount of power provided to cell 40 proportional to variations in the level of suspended solids to ionize carrier water to release ions for adequate and consistent dosing of the untreated fresh raw water in system 100.

In accordance with one aspect of the present disclosure, when variations in TSS, TDS, DOC and or turbidity are detected in fresh raw water, power supply 50 and controller 72 dynamically vary the brine water flow rate, thereby varying the conductivity of the carrier water and varying the amount of power provided to cell 40 to ionize carrier water to release cations for adequate and consistent dosing of fresh raw water system. Alternatively, the amount of power provided to cell 40 is varied to increase ionization of carrier water to release more cations for adequate and consistent dosing of the untreated fresh raw water in system 100.

In accordance with one aspect of the present disclosure, when an increase in DOC is detected in fresh raw water, power supply 50 and controller 72 dynamically vary the brine water flow rate, thereby varying the conductivity of the carrier water and varying the amount of power provided to cell 40 to increase ionization of the carrier water to release more cations for adequate and consistent dosing of the untreated fresh raw water in system 100.

In accordance with one aspect of the present disclosure, power supply 50 and controller 72 dynamically vary the brine water flow rate, thereby varying the conductivity of the carrier water and varying the amount of power provided to cell 40 proportional to the change in TSS, TDS, DOC, and/or turbidity of the untreated fresh raw water to ionize the carrier water to release cations for adequate and consistent dosing of the untreated fresh raw water in system 100.

In accordance with one aspect of the present disclosure, power supply 50 and controller 72 may vary the amount of power provided to cell 40 without varying the brine water flow rate.

In accordance with one aspect of the present disclosure, power supply 50 and controller 72 may independently control the amount of power provided to cell 40, and independently control the brine water flow rate.

In accordance with one aspect of the present disclosure, power supply 50 and controller 72 dynamically vary brine water flow rate, thereby varying the conductivity of the carrier water to maintain a constant power, current, and or voltage provided to electrodes in cell 40.

In accordance with one aspect of the present disclosure, power supply 50 and controller 72 dynamically vary brine water flow rate, thereby maintaining a constant conductivity of the carrier water to maintain a constant power, current, and/or voltage provided to electrodes in cell 40.

In accordance with one aspect of the present disclosure, power supply 50 and controller 72 dynamically increase the brine water flow rate, thereby increasing the conductivity of the carrier water to increase an amount of current provided to electrodes in cell 40 without substantially increasing the voltage.

In accordance with one aspect of the present disclosure, power supply 50 and controller 72 dynamically vary the brine water flow rate, thereby varying the conductivity of the carrier water to maintain a range of voltages across cell 40, such as voltages within a range between about 0V and about 50V, between about 0V and about 30V, between about 0V and 20V, and between about 0V and about 15V.

When power supply 50 maintains a low range of voltage across cell 40, such as within a range between about 0V and about 15V, less electrostatic charge is imparted on particles entrained in the carrier water, the attraction of ions and charged particles to oppositely charged electrodes is reduced, more ions released from the electrodes may be swept into the water stream and carried out of cell 40 while the propensity of charged particles to deposit on the electrodes is lowered. As such, plugging and bridging of electrodes is reduced, which improves water flow through cell 40, prolongs the useful life of the electrodes, facilitates efficient production of more ions on a consistent basis and at reduced power requirements.

In accordance with one aspect of the present disclosure, power supply 50 and controller 72 dynamically vary the flow rate of the supply water and the flow rate of the brine water, thereby increasing the conductivity of the carrier water.

In accordance with one aspect of the present disclosure, power supply 50 and controller 72 dynamically vary the flow rate of the supply water and the flow rate of the brine water, thereby maintaining a generally constant conductivity of the carrier water.

In accordance with one aspect of the present disclosure, power supply 50 and controller 72 are operable to facilitate maintaining a constant flow rate of brine water channeled towards injector 26.

In accordance with one aspect of the present disclosure, the conductivity of the carrier water is generally greater than or equal to the conductivity of the supply water.

In accordance with one aspect of the present disclosure, the conductivity of the carrier water is generally less than or equal to the conductivity of the brine water.

The present disclosure facilitates efficient ionization of untreated fresh water by allowing more current to be channeled at lower voltages, and by regulating the conductivity of water channeled through cell 40.

By regulating carrier water conductivity (i.e., varying brine and supply water flow rates) a more efficient ionization of fresh water is attained and wastage of electrodes is avoided in part because ions are released for adequate dosing of fresh raw water based on the present water conditions and parameters.

By regulating carrier water conductivity, a compact, smaller, more efficient, reliable, and simplified power supply 50 can be used without the need for complicated circuitry.

Ionization of fresh raw water by automatically regulating carrier water conductivity simplifies the maintenance and operational requirements of water treatment by eliminating the need for an operator to constantly and manually adjust treatment settings. Moreover, the present disclosure beneficially extends the useful life of electrodes by increasing the conductivity of carrier water, thereby lowering the power required to ionize fresh water with electrodes that would otherwise be deemed exhausted.

Predicting Bioavailability of Cations

The toxicity of metal ions to aquatic organisms including biofoulants in fresh raw water systems may be affected by bioavailability of metal ions and/or metal speciation in water, which in turn may be affected by water parameters. Therefore, the toxicity of a given concentration of cations to biofoulants in fresh raw water will change as a function of variations in at least one water parameter.

To protect aquatic organisms, the Environmental Protection Agency (EPA) has developed the Biotic Ligand Model (BLM) to estimate the toxicity of metal by taking into consideration chemical parameters of a discharge-receiving water body. The acute copper BLM estimates an instant acute copper criterion, which is a maximum short-term non-toxic concentration of copper in a water sample. The EPA's BLM is applied to restrict discharges that have the potential to harm aquatic organisms in water-receiving bodies such as rivers, lakes, and estuaries.

In some embodiments of the present disclosure, controller 72 receives various water parameter data from sensors and components, calculates acute metal criterion (AMC) (i.e., an ion toxicity concentration threshold) for fresh raw water, and facilitates ionizing the carrier water channeled through cell 40 to channel and maintain cations at or above the AMC within fresh raw water intake system 100.

In some embodiments of the present disclosure, an operator may input the AMC and/or fresh raw water parameters directly into controller 72 via an HMI/PLC/Display. Controller 72 may then calculate the AMC for untreated fresh raw water to ionize the carrier water, and to channel and maintain cations within the treated water at or above the AMC threshold.

In accordance with one aspect of the present disclosure, controller 72 calculates AMC for untreated fresh raw water, and facilitates ionizing the carrier water to channel and maintain cations in the treated water at a level defined within a range between about 0.005 and about 1000 times the AMC, between about 0.005 and about 100 times the AMC, or between about 0.005 and about 10 times the AMC.

In accordance with one aspect of the present disclosure, controller 72 calculates AMC for untreated fresh raw water, and facilitates ionizing the carrier water to channel and maintain cations in the treated water within a range defined between about 0 and about 50 ppb (parts per billion), between about 0 and about 20 ppb, or between about 0 and about 10 ppb above the AMC.

By continuously maintaining a cation residual at or above the AMC from raw water intake structure 1 to coagulating tanks 7, adequate and consistent dosing may be obtained efficiently in treated water.

Management of ionization for control of biofouling in the fresh raw water intake system in accordance with the aspects of the present disclosure facilitates inhibiting fouling of fresh raw water systems, advantageously ensures consistent and adequate ion dosing, avoids wastage of electrodes, inhibits and/or reduces the risk of having excessive cations in treated water, enables the use of proximately located electrodes, thereby resulting in a simplified and more efficient ionization of fresh water while reducing acquisition, operational, and maintenance costs.

What is claimed is:

1. A method of managing ionization in a water intake system, said method comprising:
channeling a supply water stream through an electrochemical cell;
monitoring a plurality of aspects comprising at least one raw water parameter of the supply water stream, a growth stage of biofoulants in the supply water stream, a time of the year, and a predicted toxicity of cations, wherein the at least one raw water parameter includes at least one of a conductivity or a dissolved solids concentration of the supply water stream, and wherein an ion concentration of the supply water stream is not a monitored raw water parameter;

calculating, with a controller, an ion toxicity concentration threshold for the supply water stream based on the plurality of aspects, wherein the ion toxicity concentration threshold is variable as a function of variations in at least one of the plurality of aspects; and controlling the electrochemical cell such that ions are discharged into the supply water stream, wherein the electrochemical cell is controlled such that an ion concentration of a treated water stream discharged from the electrochemical cell is greater than the ion toxicity concentration threshold.

2. The method in accordance with claim 1, wherein monitoring at least one raw water parameter further comprises monitoring at least one of a pH level, a suspended solids concentration, turbidity, alkalinity, hardness, temperature, salinity, calcium level, water discoloration, foulant concentration, or light absorbance of the supply water stream.

3. The method in accordance with claim 1, wherein determining the ion toxicity concentration threshold comprises determining an ion concentration threshold at which biofoulants within the supply water stream are neutralized when the ion concentration is greater than the ion concentration threshold.

4. The method in accordance with claim 1, wherein determining the ion toxicity concentration threshold comprises dynamically determining the ion toxicity concentration threshold as a function of variations in the at least one raw water parameter.

5. The method in accordance with claim 1, wherein controlling the electrochemical cell comprises controlling the electrochemical cell such that an amount of ions discharged into the supply water stream is varied as a function of the plurality of aspects.

6. The method in accordance with claim 1, wherein controlling the electrochemical cell comprises dynamically varying an amount of power provided to the electrochemical cell as a function of variations in the plurality of aspects.

7. The method in accordance with claim 6, wherein dynamically varying an amount of power comprises:
increasing the amount of power provided to the electrochemical cell as a function of an increase in at least one of the plurality of aspects of the supply water stream; and
decreasing the amount of power provided to the electrochemical cell as a function of a decrease in at least one of the plurality of aspects of the supply water stream.

8. The method in accordance with claim 1 further comprising selectively channeling a brine stream towards the electrochemical cell such that a salinity of the supply water stream is increased.

9. A method of managing ionization in a water intake system, said method comprising:
intaking untreated fresh water;
channeling a first portion of the untreated fresh water towards a salt tank, wherein a brine stream formed from the first portion of the untreated fresh water is discharged from the salt tank;
channeling a second portion of the untreated fresh water towards an electrochemical cell to define a supply water stream;
monitoring a plurality of aspects comprising at least one raw water parameter of the supply water stream, a growth stage of biofoulants in the supply water stream, a time of the year, and a predicted toxicity of cations, wherein the at least one raw water parameter includes at least one of a conductivity or a dissolved solids concentration of the supply water stream, and wherein an ion concentration of the water intake stream is not a monitored raw water parameter;
selectively channeling the brine stream towards the electrochemical cell such that a salinity of the supply water stream is increased, the brine stream and the supply water stream defining a water intake stream, wherein a flow rate of the brine stream is varied as a function of variations in at least one of the plurality of aspects, and wherein the increased salinity facilitates increasing ionization efficiency in the electrochemical cell; and
controlling the electrochemical cell to discharge ions into the water intake stream such that an ionized water stream is discharged from the electrochemical cell, and such that an amount of ions discharged into the supply water stream is varied as a function of the plurality of aspects.

10. The method in accordance with claim 9 further comprising
channeling the ionized water stream for combination with the untreated fresh water such that a treated water stream is formed.

11. The method in accordance with claim 10, wherein channeling the ionized water stream comprises combining the ionized water stream with the untreated fresh water at a water intake structure of the water intake system.

12. The method in accordance with claim 10 further comprising distributing the treated water stream throughout the water intake system.

13. The method in accordance with claim 10 further comprising:
injecting at least one of a flocculent substance or a coagulant substance into the treated water stream, wherein the flocculent substance and the coagulant substance are configured to form agglomerated particles from contaminants entrained in the treated water stream; and
separating the agglomerated particles from the treated water stream such that clarified water is formed.

14. The method in accordance with claim 13 further comprising injecting a disinfectant into the clarified water.

15. The method in accordance with claim 9 further comprising:
monitoring a flow rate of the supply water stream; and
shutting off power to the electrochemical cell when the flow rate of the supply water stream is outside a predetermined range.

16. A water intake system comprising:
an electrochemical cell configured to receive a supply water stream;
at least one water sensor positioned upstream from said electrochemical cell, wherein said at least one water sensor is configured to monitor a plurality of aspects comprising at least one raw water parameter of the supply water stream channeled towards said electrochemical cell, a growth stage of mollusks in the supply water stream, a time of the year, and a predicted toxicity of cations, wherein the at least one raw water parameter includes at least one of a conductivity or a dissolved solids concentration of the supply water stream, and wherein the at least one parameter does not include ion concentration;

a power supply electrically coupled to said electrochemical cell; and a controller electrically coupled to said at least one water sensor and said power supply, wherein said controller is configured to:

receive data on the plurality of aspects from said at least one water sensor;

calculate an ion toxicity concentration threshold for the supply water stream based on the plurality of aspects, wherein the ion toxicity concentration threshold is variable as a function of variations in at least one of the plurality of aspects; and control a power output supplied to said electrochemical cell such that an amount of ions discharged into the supply water stream is greater than the ion toxicity concentration threshold.

17. The system in accordance with claim 16 further comprising:

a salt tank configured to receive a first portion of untreated fresh water therein, and configured to salinate the first portion of untreated fresh water such that a brine stream is discharged therefrom; and a first pump configured to discharge the brine stream towards said electrochemical cell, said first pump electrically coupled to said controller, wherein said controller is configured to selectively actuate said first pump as a function of the at least one raw water parameter.

18. The system in accordance with claim 17 further comprising an injector configured to receive the brine stream and a second portion of the untreated fresh water therein, said injector further configured to combine the brine stream and the second portion of the untreated fresh water to form a carrier water stream, the said electrochemical cell configured to receive the carrier water stream.

19. The system in accordance with claim 16 further comprising a water intake structure configured to receive an ionized water stream from said electrochemical cell and untreated water, wherein said water intake structure is configured to combine the ionized water stream and the untreated water such that a treated water stream is formed.

20. The system in accordance with claim 19, wherein said water intake structure is in flow communication with said electrochemical cell such that the treated water stream is channeled towards said electrochemical cell.

* * * * *